US012056970B2

(12) United States Patent
Niu et al.

(10) Patent No.: US 12,056,970 B2
(45) Date of Patent: Aug. 6, 2024

(54) SHELF SYSTEM AND CONTROL METHOD

(71) Applicants: Beijing BOE Display Technology Co., Ltd., Beijing (CN); BOE Technology Group Co., Ltd., Beijing (CN)

(72) Inventors: Hanzhang Niu, Beijing (CN); Shou Li, Beijing (CN); Junning Su, Beijing (CN); Hengyu Yan, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 19 days.

(21) Appl. No.: 17/761,533

(22) PCT Filed: May 12, 2021

(86) PCT No.: PCT/CN2021/093178
§ 371 (c)(1),
(2) Date: Mar. 17, 2022

(87) PCT Pub. No.: WO2021/238646
PCT Pub. Date: Dec. 2, 2021

(65) Prior Publication Data

US 2023/0076584 A1 Mar. 9, 2023

(30) Foreign Application Priority Data

May 27, 2020 (CN) ........................ 202010461742.X

(51) Int. Cl.
*G07C 9/00* (2020.01)

(52) U.S. Cl.
CPC ..... *G07C 9/00896* (2013.01); *G07C 9/00563* (2013.01)

(58) Field of Classification Search
CPC .. G07C 9/00; G07C 9/00174; G07C 9/00896; G07C 9/00904; G07C 9/00912;
(Continued)

(56) References Cited

U.S. PATENT DOCUMENTS

2018/0285959 A1 10/2018 Peyer et al.
2019/0063140 A1* 2/2019 Trundle ............ G07C 9/00571
(Continued)

FOREIGN PATENT DOCUMENTS

CN 100403346 C * 7/2008 ............ A47L 23/22
CN 108389320 A 8/2018
(Continued)

OTHER PUBLICATIONS

CN 202010461742.X first office action.
PCT/CN2021/093178 internation search report and written opinion.

*Primary Examiner* — Nathan Cumar
(74) *Attorney, Agent, or Firm* — IPro, PLLC

(57) ABSTRACT

The present disclosure provides a shelf system and a control method. The shelf system includes: a shelf body including an accommodation cavity; an image collection element mounted on the shelf body; a transparent touch display panel mounted on the shelf body and covering at least a part of the accommodation cavity, a light ray passing through the transparent touch display panel at a side away from the shelf body into an interior of the accommodation cavity; and a controller coupled to the transparent touch display panel and the image collection element, and configured to obtain image information collected by the image collection element, obtain a touch operation on the transparent touch display panel, and output a display signal for the transparent touch display panel and/or a control signal corresponding to the touch operation in accordance with the image information and the touch operation.

18 Claims, 1 Drawing Sheet

(58) Field of Classification Search
CPC ............ G07C 9/00563; G07C 9/00571; G07C 2009/0092; G07C 2009/00928; G07C 2009/00936
USPC ............................................................. 70/77
See application file for complete search history.

(56) References Cited

U.S. PATENT DOCUMENTS

2019/0306490 A1* 10/2019 Li ........................ H04N 13/366
2020/0077826 A1* 3/2020 Chenier ............ G07C 9/00912

FOREIGN PATENT DOCUMENTS

| | | | | |
|---|---|---|---|---|
| CN | 108389320 | A | * | 8/2018 |
| CN | 108520594 | A | | 9/2018 |
| CN | 108665623 | A | | 10/2018 |
| CN | 108710874 | A | * | 10/2018 |
| CN | 108710874 | A | | 10/2018 |
| CN | 108922029 | A | | 11/2018 |
| CN | 208240123 | U | | 12/2018 |
| CN | 109147170 | A | | 1/2019 |
| CN | 109637017 | A | | 4/2019 |
| CN | 109697786 | A | | 4/2019 |
| CN | 209103314 | U | | 7/2019 |
| CN | 209149428 | U | | 7/2019 |
| CN | 110477631 | A | * | 11/2019 |
| CN | 110853197 | A | * | 2/2020 |
| CN | 111612970 | A | | 9/2020 |

* cited by examiner

SHELF SYSTEM AND CONTROL METHOD

CROSS REFERENCE TO RELATED APPLICATIONS

This application is the U.S. national phase of PCT Application No. PCT/CN2021/093178 filed on May 12, 2021, which claims a priority of the Chinese Patent Application No. 202010461742.X, filed on May 27, 2020, the entire contents of which are hereby incorporated by reference.

TECHNICAL FIELD

The present disclosure relates to the field of product display technology, in particular to a shelf system and a control method.

BACKGROUND

At present, vending machines are a completely new commercial retail form. Usually, the vending machine displays goods through a transparent glass cabinet, and mobile payment is achieved by a mobile phone through scanning a QR code, so as to realize transaction.

This kind of vending machine has a simple structure and a large volume, so it is impossible to meet the market demand on the vending machines with various structures, small size, and diversified interaction and payment modes.

SUMMARY

In one aspect, the present disclosure provides in some embodiments a shelf system, including: a shelf body including an accommodation cavity; an image collection element mounted on the shelf body; a transparent touch display panel mounted on the shelf body and covering at least a part of the accommodation cavity, a light ray passing through the transparent touch display panel at a side away from the shelf body into an interior of the accommodation cavity; and a controller coupled to the transparent touch display panel and the image collection element, and configured to obtain image information collected by the image collection element, obtain a touch operation on the transparent touch display panel, and output a display signal for the transparent touch display panel and/or a control signal corresponding to the touch operation in accordance with the image information and the touch operation.

In a possible embodiment of the present disclosure, the shelf system further includes a door body, a first side edge of the door body is coupled to the shelf body via a rotating shaft, and a second side edge of the door body is coupled to the shelf body via an electric lock. The controller is specifically configured to output a control signal for controlling the electric lock to be opened when a target user has been identified in accordance with the image information and the touch operation on the transparent touch display panel indicates that the door body is to be unlocked.

In a possible embodiment of the present disclosure, the controller is further configured to obtain an unlocked state of the door body through the image collection element, output a control signal for controlling the electric lock to be closed when the door body is switched from the unlocked state to a locked state, obtain image information about the interior of the accommodation cavity through the image collection element, and output a display signal for displaying an item settlement interface to the transparent touch display panel in accordance with the image information.

In a possible embodiment of the present disclosure, the transparent touch display panel covers a first portion of the accommodation cavity, and the shelf system further includes a transparent glass plate covering a second portion of the accommodation cavity.

In a possible embodiment of the present disclosure, a display surface of the transparent touch display panel is located on a same plane as an outer surface of the transparent glass plate.

In a possible embodiment of the present disclosure, the transparent touch display panel and/or the transparent glass plate are mounted on the door body.

In a possible embodiment of the present disclosure, the shelf system further includes an infrared recognition element. The controller is further coupled to the infrared recognition element, and configured to output a display signal for displaying a human face recognition interface to the transparent touch display panel in accordance with human body information recognized by the infrared recognition element, and control the image collection element to collect the image information.

In a possible embodiment of the present disclosure, the transparent touch display panel includes a touch display driving chip, and the controller is coupled to the touch display driving chip via a signal format conversion unit and configured to output a display signal to the touch display driving chip.

In a possible embodiment of the present disclosure, the controller is coupled to the image collection element via a Universal Serial Bus (USB) Ethernet adapter and a Power over Ethernet (POE) switch.

In a possible embodiment of the present disclosure, the image collection element includes at least one network camera mounted on the shelf body.

In a possible embodiment of the present disclosure, the image collection element further includes a three-dimensional (3D) face recognition camera mounted on the shelf body.

In a possible embodiment of the present disclosure, the controller is coupled to the electric lock via a serial control panel.

In a possible embodiment of the present disclosure, the shelf system further includes a refrigerating assembly and a temperature sensor arranged on the shelf body and coupled to the controller.

In a possible embodiment of the present disclosure, the shelf system further includes a heating element arranged within the accommodation cavity of the shelf body.

In a possible embodiment of the present disclosure, the temperature sensor, the refrigerating assembly and the heating element are coupled to the controller via the serial control panel.

In another aspect, the present disclosure provides in some embodiments a method for controlling a shelf system. The shelf system includes a shelf body, and a transparent touch display panel and an image collection element mounted on the shelf body. The method includes: obtaining image information collected by the image collection element and a touch operation on the transparent touch display panel; and outputting a display signal for the transparent touch display panel and/or a control signal corresponding to the touch operation in accordance with the image information and the touch operation.

In a possible embodiment of the present disclosure, the shelf system further includes a door body, a first side edge of the door body is coupled to the shelf body via a rotating shaft, and a second side edge of the door body is coupled to the shelf body via an electric lock. The outputting the display signal of the transparent touch display panel and/or the control signal corresponding to the touch operation in accordance with the image information and the touch operation includes: performing human face image recognition in accordance with the image information; and when a target user has been identified and the touch operation indicates that the door body is to be unlocked in accordance with the touch operation on the transparent touch display panel, outputting a control signal for controlling the electric lock to be opened.

DETAILED DESCRIPTION

In order to make the objects, the technical solutions and the advantages of the present disclosure more apparent, the present disclosure will be described hereinafter in a clear and complete manner in conjunction with the drawings and embodiments.

In order to solve the problem in the related art where a shelf system has a simple structure, a large volume and a single interaction mode with a user, the present disclosure provides in some embodiments a shelf system, and an image collection element and a transparent touch display panel are provided on a shelf body. Through the transparent touch display panel, it is able to not only realize the interaction with the user but also display an interior of the shelf body, thereby to provide a structurally diversified and small shelf system. In addition, the image collection element is configured to collect an image. A display signal for the transparent touch display panel and/or a control signal corresponding to a touch operation on the transparent touch display panel are outputted in accordance with image information collected by the image collection element and the touch operation, so it is able to meet the requirement on diversified interaction between the shelf system and the user.

Figure 1:
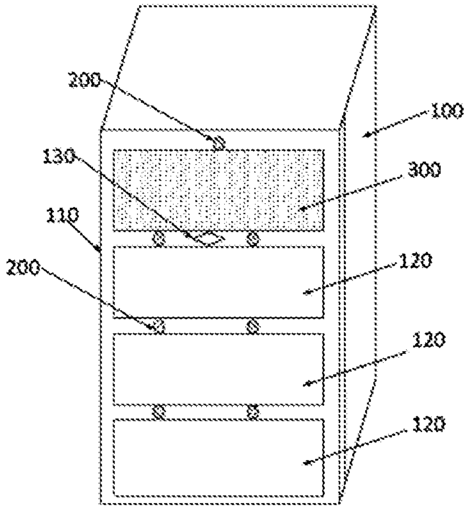
FIG. 1 is a schematic view showing an appearance of a shelf system according to one embodiment of the present disclosure.

The present disclosure provides in some embodiments a shelf system which, as shown in FIG. 1, includes: a shelf body 100 including an accommodation cavity; an image collection element 200 installed on the shelf body 100; a transparent touch display panel 300 mounted on the shelf body 100 and covering at least a part of the accommodation cavity, a light ray passing through the transparent touch display panel 300 at a side away from the shelf body 100 into an interior of the accommodation cavity; and a controller (not shown) coupled to the transparent touch display panel 300 and the image collection element 200, and configured to obtain image information collected by the image collection element 200, obtain a touch operation on the transparent touch display panel 300, and output a display signal for the transparent touch display panel 300 and/or a control signal corresponding to the touch operation in accordance with the image information and the touch operation.

In a possible embodiment of the present disclosure, the quantity of image collection elements 200 may be multiple. For example, a plurality of network cameras may be provided to collect image information about an interior of the accommodation cavity of the shelf body 100 and image information about an external environment of the shelf body 100.

Further, in a possible embodiment of the present disclosure, the controller is coupled to the image collection element 200 to obtain the image information about the external environment of the shelf body 100 collected by the image collection element 200, perform face recognition analysis on the collected image information, display an interactive interface on the transparent touch display panel 300, receive an operation made by a user on the interactive interface of the transparent touch display panel 300, and output a corresponding control signal in accordance with the operation.

In a possible embodiment of the present disclosure, as shown in FIG. 1, the shelf system further includes a door body 110, a first side edge of the door body 110 is coupled to the shelf body 100 via a rotating shaft, and a second side edge of the door body 110 is coupled to the shelf body 100 via an electric lock.

The controller is specifically configured to output a control signal for controlling the electric lock to be opened when a target user has been recognized in accordance with the image information and the touch operation on the transparent touch display panel 300 indicates that the door body 110 is to be unlocked.

The first side edge is opposite to the second side edge, or is an adjacent side edge.

Based on the above, through the electric lock between the door body 110 and the shelf body 100, the door body 110 is capable of being switched between an unlocked state and a locked state relative to the shelf body 100. To be specific, when the electric lock is in a closed state, the controller performs the face recognition analysis on the image information collected by the image collection element 200, receives the user's operation on the interactive interface of the transparent touch display panel 300, and outputs the control signal for controlling the electric lock to be opened when the target user has been recognized.

In a possible embodiment of the present disclosure, the controller is further configured to obtain the unlocked state of the door body 110 through the image collection element 200, output a control signal for controlling the electric lock to be closed when the door body 110 is switched from the unlocked state to the locked state, obtain the image information about the interior of the accommodation cavity through the image collection element 200, and output a display signal for displaying an item settlement interface to the transparent touch display panel 300 in accordance with the image information.

In a possible embodiment of the present disclosure, the door body 110 covers the accommodation cavity, and the accommodation cavity is exposed or unexposed through opening or closing the door body 110. The controller is configured to obtain the image information about the interior of the accommodation cavity after the door body 110 is switched from the unlocked state to the locked state in accordance with the image information collected by the image collection element 200, determine a change in the items in the accommodation cavity before and after the door body 110 has been unlocked, and control the transparent touch display panel 300 to display the item settlement interface, so as to achieve a vending function of the shelf system.

In a possible embodiment of the present disclosure, as shown in FIG. 1, the transparent touch display panel 300 covers a first portion of the accommodation cavity, and the shelf system further includes a transparent glass plate 120 for covering a second portion of the accommodation cavity.

Based on the above, on the shelf body 100, the transparent touch display panel 300 covers the first portion of the accommodation cavity, and the items in the first portion may be viewed through the transparent touch display panel 300. The transparent glass plate 120 covers the second portion of the accommodation cavity, and the items in the first portion may be viewed through the transparent glass plate 120. In this way, all the items in the accommodation cavity may be viewed from the outside through the transparent glass plate 120 and the transparent touch display panel 300 without any necessity to cover the accommodation cavity with the transparent touch display panel 300, as long as the transparent touch display panel 300 has an area sufficiently to meet the requirement on the touch operation, so it is able to reduce the manufacture cost of the shelf system.

In a possible embodiment of the present disclosure, as shown in FIG. 1, a display surface of the transparent touch display panel 300 is located on a same plane as an outer surface of the transparent glass plate 120.

Specifically, the accommodation cavity of the shelf body 100 is provided with an opening to expose the accommodation cavity, and the transparent touch display panel 300 and the transparent glass plate 120 are arranged at the opening to completely cover the accommodation cavity. The items inside the accommodation cavity are displayed through the touch display panel 300 and the transparent glass plate 120.

In a possible embodiment of the present disclosure, as shown in FIG. 1, when the shelf system further includes the door body 110 mounted on the shelf body 100, the transparent touch display panel 300 and/or the transparent glass plate 120 are mounted on the door body 110. Specifically, a first side edge of the door body 110 is coupled to the shelf body 100 via a rotating shaft, and a second side edge is coupled to the shelf body 100 through an electric lock. Through the electric lock between the door body 110 and the shelf body 110, the door body 110 is capable of being switched between an unlocked state and a locked state relative to the door body 100. Because the transparent touch display panel 300 and/or the transparent glass plate 120 are mounted on the door body 110, they may rotate along with the door body 110 when the door body 11 rotates relative to the shelf body 110.

In a possible embodiment of the present disclosure, the transparent touch display panel 300 and the transparent glass plate 120 are both mounted on the door body 110. In another possible embodiment of the present disclosure, the door body 110 includes two separate parts, and each part may rotate relative to the shelf body 100 and locked by the electric lock. The touch display panel 300 and the transparent glass plate 120 are provided on the two parts of the door body 110 respectively.

In a possible embodiment of the present disclosure, as shown in FIG. 1, the shelf system further includes an infrared recognition element 130. The controller is further coupled to the infrared recognition element 130, and configured to output a display signal for displaying a human face recognition interface to the transparent touch display panel 300 in accordance with human body information obtained by the infrared recognition element 130, and control the image collection element 200 to collect the image information.

Specifically, in the system shelf according to the embodiments of the present disclosure, the controller obtains a sensing signal from the infrared recognition element 130 and the image information from the image collection element 200, and control the interaction between the transparent touch display panel 300 and the user, so as to achieve self-service vending of the items in the accommodation cavity.

Specifically, a self-serve vending process will be described hereinafter.

When a person approaches to the shelf system, the infrared recognition element 130 recognizes a human body sensing signal. The controller obtains the human body sensing signal, and outputs a displaying signal to the transparent touch display panel 300, so that the transparent touch display panel 300 displays an interactive interface. In a possible embodiment of the present disclosure, the interactive interface displays a human face recognition window, so as to prompt the user to input a human face image in the human face recognition window.

The image collection element 200 obtains the human face image inputted by the user in the human face recognition window. The human face image is compared with pre-stored information about a registered user inputted by the user, and when the user is a registered target user, a displaying signal is outputted to the transparent touch display panel 300, so as to enable the transparent touch display panel 300 to display a confirmation message prompting the user that the door body of the shelf system is to be unlocked.

Upon the receipt of a confirmation input triggered by a user through the transparent touch display panel 300, an opening control signal is outputted to the electric lock of the door body.

After the output of the opening control signal to the electric lock, the image information collected by the image collection element 200 is monitored so as to determine whether the door body has been switched from the unlocked state to the locked state.

After the door body has been switched from the unlocked state to the locked state, a closing control signal is outputted to the electric lock of the door body.

After the door body has been locked, the image collection element 200 collects the image information about the interior of the accommodation cavity, and compares the image information with previous-collected image information, so as to determine a sales list of the items in the accommodation cavity, and control the transparent touch display panel 300 to display an item settlement interface.

Payment information inputted by the user on the item settlement interface of the transparent touch display panel 300 is obtained, so as to settle the payment for the items.

In a possible embodiment of the present disclosure, the transparent touch display panel 300 may be one of a transparent liquid crystal display panel and a transparent Organic Light-Emitting Diode (OLED) display panel.

Further, as shown in FIG. 1, the image collection elements 200 may be arranged at a plurality positions of the shelf body 100. In a possible embodiment of the present disclosure, the image collection element 200 is also provided inside the accommodation cavity of the shelf body 100 so as to collect the image information at different positions. In a possible embodiment of the present disclosure, the image collection element 200 may include a 3D face recognition camera for collecting a face image.

In a possible embodiment of the present disclosure, the shelf system further includes a refrigerating assembly disposed on the shelf body 100, such as a compressor, a condenser and/or an evaporator, so as to keep the items fresh in the accommodation cavity. In a possible embodiment of the present disclosure, the shelf system is also provided with a temperature sensor coupled to the controller. The controller is configured to monitor a temperature inside the accommodation cavity, so as to adjust the temperature and maintain a stable temperature in the accommodation cavity.

In a possible embodiment of the present disclosure, a heating element is also provided within the accommodation cavity of the shelf system, so as to heat the transparent glass plate of the shelf body 100 for defogging.

Figure 2:
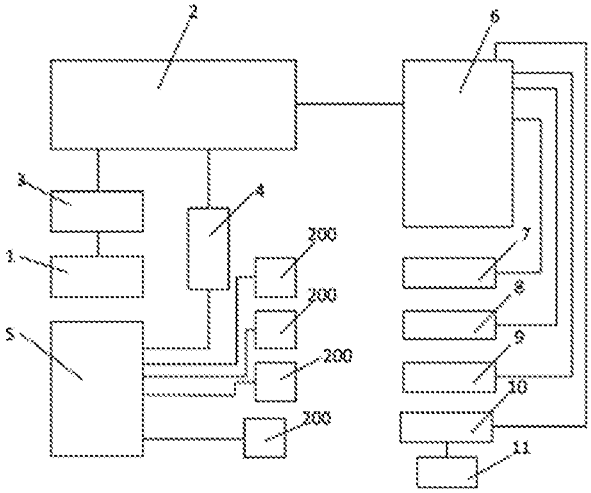
FIG. 2 is a schematic view showing a circuit system of the shelf system according to one embodiment of the present disclosure.

In a possible embodiment of the present disclosure, FIG. 2 shows a circuit system of the shelf system. In the shelf system, the transparent touch display panel includes a touch control display driving chip 1. The controller 2 is coupled to the touch control display driving chip 1 via a signal format conversion unit 3, and outputs a display signal to the touch control display driving chip 1.

Further, the controller 2 is coupled to the image collection element 200 via a USB Ethernet adapter 4 and a POE switch 5.

In addition, the controller 2 is coupled to the electric lock 7 via a serial control panel 6. In a possible embodiment of the present disclosure, the temperature sensor 8, the refrigerating assembly 9 and the heating element of the shelf system are coupled to the serial control panel 6, and the controller 2 outputs a control signal to each component via the serial control panel 6.

In a possible embodiment of the present disclosure, a backlight 10 and a light source 11 coupled to the backlight are provided in the accommodation cavity of the shelf system, so as to illuminate the interior of the accommodation cavity. The backlight 10 is coupled to the serial control panel 6, and controlled by the controller 2 through the serial control panel 6.

Based on the above-mentioned circuit system, the image information collected by the image collection element 200 is transmitted to the controller 2 through the POE switch 5 and the Ethernet adapter 4. The image information processed by the controller 2 is transmitted to the touch display driving chip 1 through the signal format conversion unit, so that the touch display driving chip 1 drives the transparent touch display panel 300 to display an image in a semi-transparent manner.

According to the shelf system in the embodiments of the present disclosure, the interior of the shelf body is normally viewed through the transparent touch display panel 300. Through the transparent touch display panel, it is able to achieve the interaction with the user and display the interior of the shelf body, thereby to meet the requirement on a structurally diversified, and small shelf system. In addition, the image information is collected by the image collection element, and the display signal for the transparent touch display panel and/or the control signal corresponding to the touch operation are outputted in accordance with the image information collected by the image collection element and the touch operation on the transparent display panel, so as to meet the requirement on diversified interaction modes between the shelf system and the user.

Figure 3:
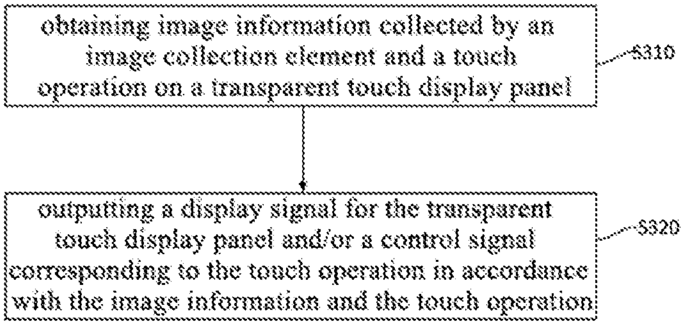
FIG. 3 is a flow chart of a control method according to one embodiment of the present disclosure.

The present disclosure further provides in some embodiments a method for controlling a shelf system. The shelf system includes a shelf body, and a transparent touch display panel and an image collection element mounted on the shelf body. As shown in FIG. 3, the method includes: S310 of obtaining image information collected by the image collection element and a touch operation on the transparent touch display panel; and S320 of outputting a display signal for the transparent touch display panel and/or a control signal corresponding to the touch operation in accordance with the image information and the touch operation.

In a possible embodiment of the present disclosure, the shelf system further includes a door body, a first side edge of the door body is coupled to the shelf body via a rotating shaft, and a second side edge of the door body is coupled to the shelf body via an electric lock. S320 of outputting the display signal of the transparent touch display panel and/or the control signal corresponding to the touch operation in accordance with the image information and the touch operation includes: performing human face image recognition in accordance with the image information; and when a target user has been identified and the touch operation indicates that the door body is to be unlocked in accordance with the touch operation on the transparent touch display panel, outputting a control signal for controlling the electric lock to be opened.

In a possible embodiment of the present disclosure, the method further includes: when the door body is switched from the unlocked state to the lock state, outputting a control signal for controlling the electric lock to be closed, obtaining image information about an interior of the accommodation cavity through the image collection element, and outputting a display signal for displaying an item settlement interface to the transparent touch display panel in accordance with the image information.

In a possible embodiment of the present disclosure, when the shelf system further includes an infrared recognition element, the method further includes: obtaining a sensing signal collected by the infrared recognition element; and recognizing human body information in accordance with the sensing signal, outputting a display signal for displaying a human face recognition interface to the transparent touch display panel, and controlling the image collection element to collect human face image information.

According to the control method in the embodiments of the present disclosure, it is able to obtain the sensing signal from the infrared recognition element and the image information from the image collection element, and control the interaction between the transparent touch display panel and the user, thereby to achieve self-service vending of the items in the accommodation cavity of the shelf system.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A shelf system, comprising:

a shelf body comprising an accommodation cavity;

an image collection element mounted on the shelf body;

a transparent touch display panel mounted on the shelf body and covering at least a part of the accommodation cavity, a light ray passing through the transparent touch display panel at a side away from the shelf body into an interior of the accommodation cavity;

a controller coupled to the transparent touch display panel and the image collection element, and configured to obtain image information collected by the image collection element, obtain a touch operation on the transparent touch display panel, and output a display signal for the transparent touch display panel and/or a control signal corresponding to the touch operation in accordance with the image information and the touch operation; and an infrared recognition element, wherein the controller is further coupled to the infrared recognition element, and configured to output a display signal for displaying a human face recognition interface to the transparent touch display panel in accordance with human body information recognized by the infrared recognition element, and control the image collection element to collect the image information.

2. The shelf system according to claim 1, further comprising a door body, wherein a first side edge of the door body is coupled to the shelf body via a rotating shaft, and a second side edge of the door body is coupled to the shelf body via an electric lock, wherein the controller is specifically configured to output a control signal for controlling the electric lock to be opened when a target user has been identified in accordance with the image information and the touch operation on the transparent touch display panel indicates that the door body is to be unlocked.

3. The shelf system according to claim 2, wherein the controller is further configured to obtain an unlocked state of the door body through the image collection element, output a control signal for controlling the electric lock to be closed when the door body is switched from the unlocked state to a locked state, obtain image information about the interior of the accommodation cavity through the image collection element, and output a display signal for displaying an item settlement interface to the transparent touch display panel in accordance with the image information.

4. The shelf system according to claim 3, wherein the transparent touch display panel covers a first portion of the accommodation cavity, and the shelf system further comprises a transparent glass plate covering a second portion of the accommodation cavity.

5. The shelf system according to claim 3, wherein the transparent touch display panel covers a first portion of the accommodation cavity, the shelf system further comprises a transparent glass plate covering a second portion of the accommodation cavity, and the transparent touch display panel and/or the transparent glass plate are mounted on the door body.

6. The shelf system according to claim 2, wherein the transparent touch display panel covers a first portion of the accommodation cavity, the shelf system further comprises a transparent glass plate covering a second portion of the accommodation cavity, and the transparent touch display panel and/or the transparent glass plate are mounted on the door body.

7. The shelf system according to claim 2, wherein the controller is coupled to the electric lock via a serial control panel.

8. The shelf system according to claim 7, further comprising a refrigerating assembly and a temperature sensor arranged on the shelf body and coupled to the controller.

9. The shelf system according to claim 8, further comprising a heating element arranged within the accommodation cavity of the shelf body.

10. The shelf system according to claim 9, wherein the temperature sensor, the refrigerating assembly and the heating element are coupled to the controller via the serial control panel.

11. The shelf system according to claim 2, wherein the transparent touch display panel covers a first portion of the accommodation cavity, and the shelf system further comprises a transparent glass plate covering a second portion of the accommodation cavity.

12. The shelf system according to claim 1, wherein the transparent touch display panel covers a first portion of the accommodation cavity, and the shelf system further comprises a transparent glass plate covering a second portion of the accommodation cavity.

13. The shelf system of claim 1, wherein the transparent touch display panel comprises a touch display driving chip, and the controller is coupled to the touch display driving chip via a signal format conversion unit and configured to output a display signal to the touch display driving chip.

14. The shelf system according to claim 1, wherein the controller is coupled to the image collection element via a Universal Serial Bus (USB) Ethernet adapter and a Power over Ethernet (POE) switch.

15. The shelf system of claim 1, wherein the image collection element comprises at least one network camera mounted on the shelf body.

16. The shelf system of claim 15, wherein the image collection element further comprises a 3D face recognition camera mounted on the shelf body.

17. A method for controlling a shelf system, wherein the shelf system comprises a shelf body, a transparent touch display panel and an image collection element mounted on the shelf body, a controller coupled to the transparent touch display panel and the image collection element, and an infrared recognition element, wherein the controller is further coupled to the infrared recognition element, wherein the method comprises: obtaining image information collected by the image collection element and a touch operation on the transparent touch display panel; outputting a display signal for the transparent touch display panel and/or a control signal corresponding to the touch operation in accordance with the image information and the touch operation; and outputting a display signal for displaying a human face recognition interface to the transparent touch display panel in accordance with human body information recognized by the infrared recognition element, and control the image collection element to collect the image information.

18. The method according to claim 17, wherein the shelf system further comprises a door body, a first side edge of the door body is coupled to the shelf body via a rotating shaft, and a second side edge of the door body is coupled to the shelf body via an electric lock, wherein the outputting the display signal of the transparent touch display panel and/or the control signal corresponding to the touch operation in accordance with the image information and the touch operation comprises: performing human face image recognition in accordance with the image information; and when a target user has been identified and the touch operation indicates that the door body is to be unlocked in accordance with the touch operation on the transparent touch display panel, outputting a control signal for controlling the electric lock to be opened.

* * * * *